US008457642B2

(12) United States Patent
Comeau et al.

(10) Patent No.: US 8,457,642 B2
(45) Date of Patent: Jun. 4, 2013

(54) DETERMINING A COORDINATING SET OF CELLS FOR MULTIPOINT RECEPTION OF UPLINK TRANSMISSION FROM A MOBILE TERMINAL

(75) Inventors: Adrien Joseph Comeau, Ottawa (CA); Gregory Allan Osborne, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/155,631

(22) Filed: Jun. 8, 2011

(65) Prior Publication Data

US 2012/0315917 A1    Dec. 13, 2012

(51) Int. Cl.
H04W 36/00    (2009.01)
(52) U.S. Cl.
USPC ........... 455/442; 455/436; 455/450; 370/331; 370/252; 370/329
(58) Field of Classification Search
USPC .. 370/331, 335, 332, 342, 252, 329; 455/442, 455/405, 436, 428, 450, 550.1; 375/142
See application file for complete search history.

(56) References Cited

U.S. PATENT DOCUMENTS

| 7,450,914 | B2 * | 11/2008 | Valdivia et al. ............... 455/121 |
| 8,305,987 | B2 * | 11/2012 | Fong et al. ..................... 370/329 |
| 2005/0192031 | A1 * | 9/2005 | Vare ............................ 455/456.6 |
| 2008/0270605 | A1 | 10/2008 | Berstis et al. |
| 2010/0142466 | A1 | 6/2010 | Palanki et al. |
| 2010/0173660 | A1 * | 7/2010 | Liu et al. ........................ 455/501 |
| 2010/0311349 | A1 | 12/2010 | Koo et al. |
| 2011/0080879 | A1 * | 4/2011 | Grant ............................ 370/329 |
| 2011/0085460 | A1 * | 4/2011 | Zhang et al. .................. 370/252 |
| 2011/0124345 | A1 | 5/2011 | Lee et al. |
| 2011/0235603 | A1 | 9/2011 | Cheng et al. |
| 2011/0281585 | A1 | 11/2011 | Kwon et al. |
| 2011/0312328 | A1 * | 12/2011 | Choi et al. .................... 455/450 |
| 2012/0028665 | A1 | 2/2012 | Kwon et al. |
| 2012/0082058 | A1 * | 4/2012 | Gerstenberger et al. ....... 370/252 |
| 2012/0157108 | A1 * | 6/2012 | Boudreau et al. ............. 455/450 |

FOREIGN PATENT DOCUMENTS

| WO | 2010057446 A1 | 5/2010 |
| WO | 2010087619 A2 | 8/2010 |
| WO | 2011150262 A1 | 1/2011 |

OTHER PUBLICATIONS

Antipolis, Sohia, "Consideration on Feedback for Adaptive Cell Clustering", 3rd Generation Partnership Project (3GPP), vol. Ran WG1, no Valencia, Spain, Jan. 22, 2012, Chapter 3.1.
PCT/IB2012/052626 International Search Report.
DWPI Abstract for KR 200928901A, published Oct. 13, 2010 LG Electronics Inc., as found in Thomson Innovation.

* cited by examiner

*Primary Examiner* — Mahendra Patel
(74) *Attorney, Agent, or Firm* — Alex Nicolaescu; Ericsson Canada Inc.

(57) ABSTRACT

Methods and apparatus are provided for determining a set of cooperating cells for a mobile terminal in a mobile communication network for CoMP transmission or reception. A cell map is stored in memory of serving base station. The cell map associates one or more coordinating areas within the serving cell with corresponding sets of neighboring cells. To determine the set of cooperating cells for a given mobile terminal within a serving cell, the serving base station determines the current location of the mobile terminal. The current location of the mobile terminal is compared to the cell map stored in memory to determine the coordinating set for the mobile terminal.

20 Claims, 5 Drawing Sheets

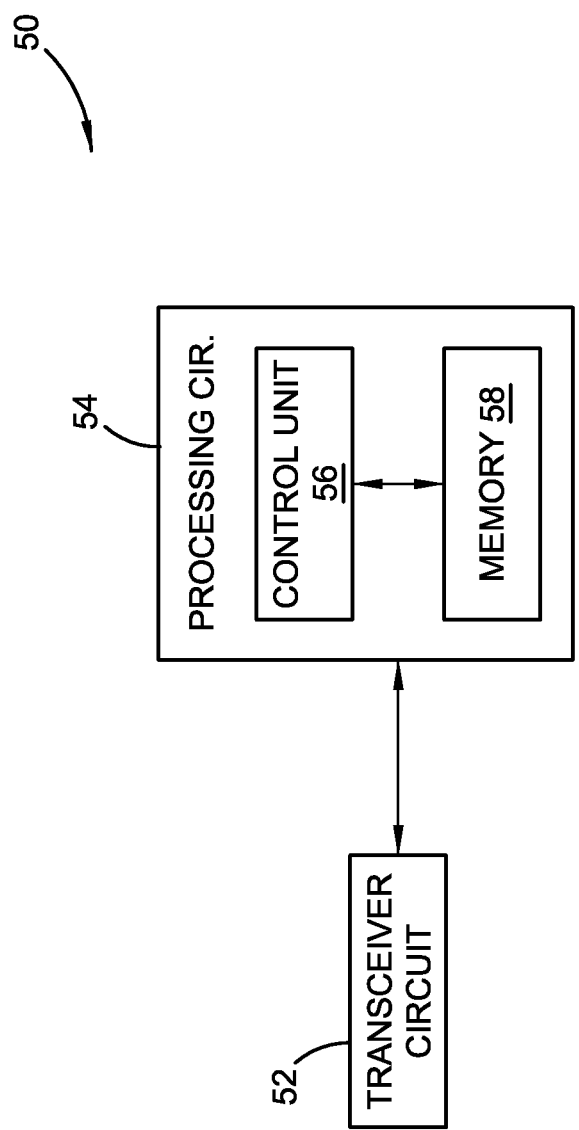

DETERMINING A COORDINATING SET OF CELLS FOR MULTIPOINT RECEPTION OF UPLINK TRANSMISSION FROM A MOBILE TERMINAL

TECHNICAL FIELD

The present invention relates generally to coordinated multipoint (CoMP) reception for the uplink in a mobile communication network and, more particularly, to a method and apparatus for determining a cooperating set of cells for multipoint reception of uplink transmissions from a mobile terminal.

BACKGROUND

The phenomenal growth in the demand for wireless communications has put persistent pressure on cellular network operators to improve the capacity of their communication networks. To improve the spectral efficiency of these networks, scarce radio resources have to be reused aggressively in neighboring cells. One goal of the Long Term Evolution (LTE) network is to provide a network with a frequency reuse factor of one, typically denoted as N=1. A frequency reuse of 1 implies that the frequencies used by the network are available in all cells. As a result, inter-cell interference has become a main source of signal disturbance, limiting not only the service quality to users at the cell edges, but also the overall system throughput.

Coordinated Multi-Point (CoMP) transmission or reception is one technique being employed to mitigate inter-cell interference. The basic idea behind CoMP is to transmit downlink signals to a mobile terminal from multiple cells and to receive uplink signals from the mobile terminal at multiple cells. CoMP transmission and reception schemes may avoid interference by coordinating downlink transmissions or using known combining techniques to significantly improve performance, particularly for mobile terminals operating near a cell edge.

In the case of CoMP reception, the uplink transmissions from a mobile terminal are received by a serving cell and one or more cooperating cells. The set of cells including the serving cell and cooperating cells is referred to as the coordinating set. The term "cooperating cell" as used herein refers to all cells in the coordinating set. The signals received by different cells in the coordinating set may be combined using techniques such maximal ratio combining (MRC), interference rejection combining (IRC) and successive interference cancellation (SIC) to improve signal quality. The combining may be performed by the serving base station in the serving cell, or by a central processing node.

Because the cells in the coordinating set are geographically separated, the signals received by the cooperating cells need to be transported to the serving cell. If a central processing node is used, the signals received by the cooperating cells and serving cell need to be transported to the central processing node. The transmission of the received signals between nodes consumes bandwidth on the signaling network. Further, processing resources at either the serving cell or central processing node must be made available to process the received signals. However, the signals received at different cells may not be of equal value. Therefore, to avoid unnecessary waste of limited bandwidth and processing resources, it is desirable to identify and select the cells providing the highest quality signals for inclusion in the coordinating set.

In a conventional homogenous network, the six cells adjacent the serving cell are likely to provide the highest quality signals. However, heterogeneous networks deploying micro cells and relays in combination with macro cells are becoming increasingly common in order to provide better coverage in areas where signals from the macro cells may be blocked. In a heterogeneous network, there is a large variation in the coverage of different cells. Thus, it cannot be assumed that the cells closest in distance to a mobile terminal are the best candidates for cooperating cells. Further, in a mixed network, the best set of cooperating cells may change with only small movement of the mobile terminal. Accordingly, identification of the best neighbor cells to serve as cooperating cells for a mobile terminal at a given location within a serving cell is problematic.

SUMMARY

The present invention provides methods and apparatus for determining the cooperating cells for a mobile terminal in a mobile communication network for CoMP transmission or reception. A cell map is stored in memory of a serving base station in a serving cell. The cell map associates one or more coordinating areas within the serving cell with corresponding sets of neighboring cells. To determine the cooperating cells for a given mobile terminal within a serving cell, the serving base station determines a current location of the mobile terminal. The current location of the mobile terminal is compared to the cell map stored in memory to determine the neighbor cells to include in the coordinating set for the mobile terminal. More particularly, the serving base station identifies the area in the cell map including the current location of the mobile terminal and selects one or more neighboring cells to include in the coordinating set.

Exemplary embodiments comprise methods of determining one or more cooperating cells for CoMP transmission and/or reception. A cell map is stored in memory of a serving base station in a serving cell. The cell map associates one or more multipoint coordinating areas within the serving cell with corresponding sets of neighboring cells. A current location of a mobile terminal within the serving cell is determined and one or more of the neighboring cells associated with the coordinating area where the mobile terminal is currently located are selected to include in the coordinating set for the mobile terminal.

Other embodiments of the invention comprise a serving base station in a mobile communication network that implements CoMP transmission and reception. The serving base station comprises a transceiver circuit and a processing circuit. The transceiver circuit transmits downlink signals to mobile terminals served by the serving base station and receives uplink signals form the mobile terminals. The processing circuit includes memory that stores a cell map associating one or more multipoint coordinating areas within the serving cell with corresponding sets of neighboring cells. More particularly, the processing circuit is configured to determine a current location of a mobile terminal within the serving cell, and to select one or more of the neighboring cells associated with the multipoint coordinating area where the mobile terminal is currently located to include in the coordinating set for the mobile terminal.

The present invention avoids unnecessary waste of signaling bandwidth and processing resources by identifying the coordinator cells with the highest probability of providing a useable signal for CoMP reception. The selection of neighboring cells for the coordinating set can be made dependent on signaling load so that more resources are used for CoMP reception under lightly loaded conditioning and fewer resources are used under more heavily loaded conditions. Or the number of neighboring cells in the coordinating set can be tailored to the Quality of Service targets for the mobile terminal.

BRIEF DESCRIPTION OF THE DRAWINGS

FIG. 5 illustrates an exemplary serving base station configured to determine the coordinating set for a mobile terminal within a serving cell as herein described

DETAILED DESCRIPTION

Figure 1:
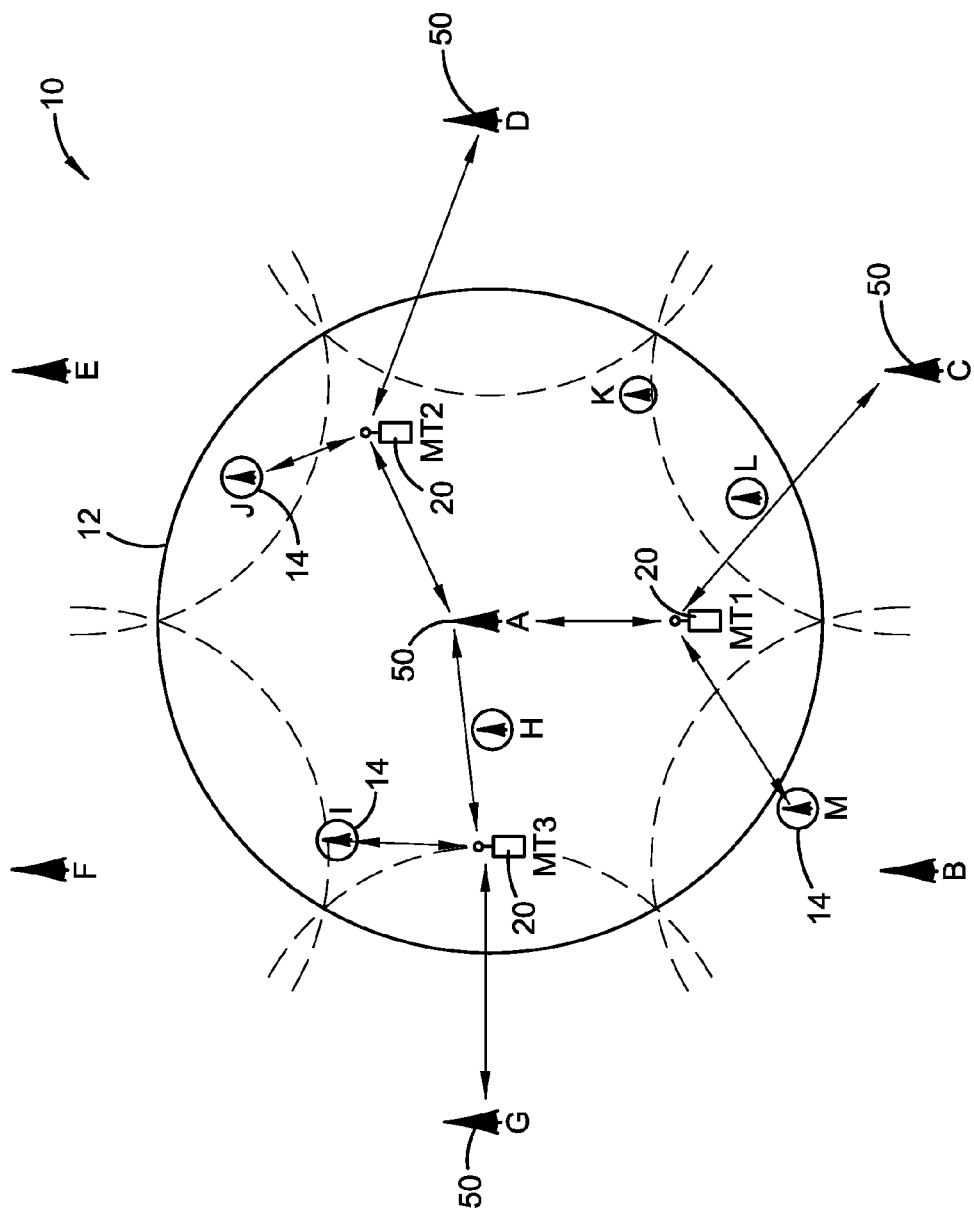
FIG. 1 illustrates an exemplary wireless network configured to implement coordinated multipoint reception as herein described.

Referring now to the drawings, FIG. 1 illustrates an exemplary wireless network 10 implementing coordinated multipoint (CoMP) transmission and reception. The network 10 comprises a plurality of macro cells 12 and a plurality of micro cells 14. As used herein, the term micro cells refers to all smaller cells that underlay the macro cellular deployment and may include, for example, cells served by home base stations and relays, pico cells, and femto cells. The purpose of the micro cells 14 is to provide local hot spots and/or coverage in areas where the reception quality of signals transmitted by the macro cells 12 is not of sufficient quality to provide a desired level of service. It is this multi level deployment that is a cornerstone of heterogeneous networks. In FIG. 1, the macro cells 12 are denoted by the letters A through G. The micro cells 14 are denoted by the letters H through M.

Each cell 12, 14 within the network 10 provides service to mobile terminals 20 within its coverage area. FIG. 1 shows three mobile terminals 20 denoted at MT1, MT2, and MT3. CoMP transmission and reception are employed so that the mobile terminals 20 receive downlink transmissions from multiple cells 12, 14. Similarly, the uplink transmissions from the mobile terminals 20 are received by multiple cells 12, 14. The uplink transmissions received by different cells 12, 14 can be combined using interference rejection combining (IRC) techniques to improve performance and provide a higher level of service. The set of cells 12, 14 that transmit signals to the mobile terminal 20 on the downlink and receive signals from the mobile terminal 20 on the uplink is referred to herein as the coordinating set. The cells 12, 14 within a coordinating set are referred to as cooperating cells. The coordinating set typically includes the serving cell providing network access and control signaling for the mobile terminal 20, and one or more neighboring cells selected to serve as cooperating cells.

When CoMP transmission or reception is desired for a given mobile terminal 20, the serving cell selects one or more neighboring cells 12, 14 to serve as cooperating cells. The selected cooperating cells along with the serving cell comprise the coordinating set. If the location of the mobile terminal 20 within the serving cell is known, a simple approach would be to select the neighboring cells 12, 14 closest to the mobile terminal 20 to serve as cooperating cells. However, because of interference levels, the neighboring cells 12, 14 that are closest in distance to the mobile terminal 20 may not always be the best choice to serve as cooperating cells. For example, the cells closest to the mobile terminal 20 may comprise micro cells 14 that transmit with lower power than a macro cell 12 that is further away. Because the disparity in transmit power may be as much as 15 dB, the macro cell 12 that is further away may be a better candidate for a cooperating cell. Also, there may be an obstruction that prevents a nearby cell from receiving signals from the mobile terminal 20. On the up link, complex interaction of the cells and the environment will make the interference levels at the cell's receivers such that distance is not a good predictor of goodness. Thus, the distance to the mobile terminal 20 is not a particularly good metric for selecting neighboring cells to serve as cooperating cells. Further, the best set of cooperating cells may change within only a small movement of the mobile terminal 20. Selecting the best set of cooperating cells 12, 14 therefore presents a challenge.

Figure 2:
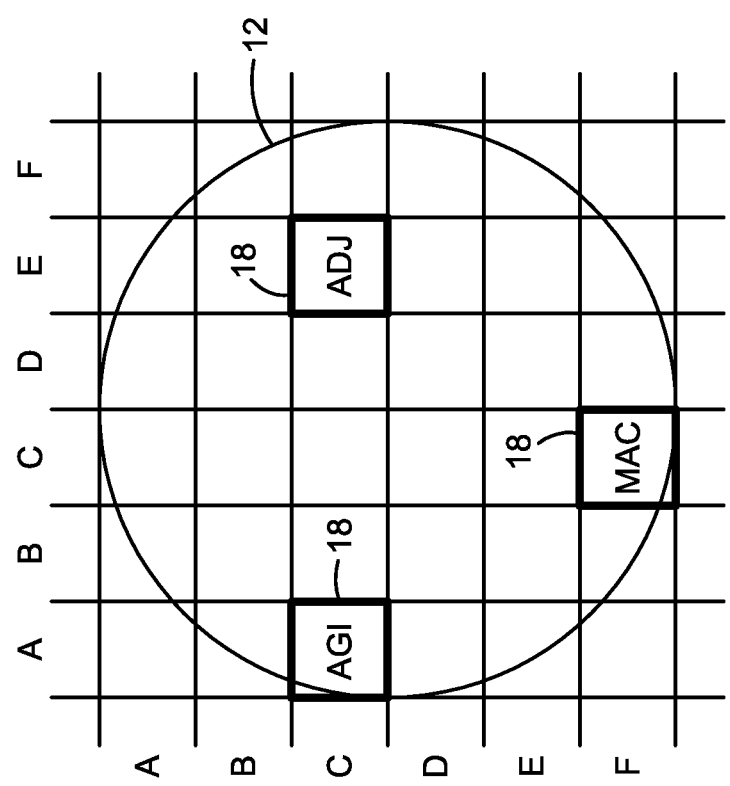
FIG. 2 graphically illustrates a cell map for determining cooperating cells for a mobile terminal.

In exemplary embodiments, a cell map is used to determine the cooperating cells for a mobile terminal 20 operating in CoMP mode. The coverage area of the cell 12, 14 is divided into a plurality of smaller areas referred to herein as multipoint coordinating (MC) areas 18. FIG. 2 shows a grid overlaid on a macro cell 12 that divides the cell area into smaller MC areas 18. Although a square grid is used in the exemplary embodiment, hexagonal grids, triangular grids, or other grid forms can be used. FIG. 2 shows the cooperating cells for three MC areas: FC, and CE, and CA, which correspond to the location of mobile terminal MT1, MT2, and MT3 in FIG. 1. The letters designating the coordinating areas 18 indicate the row and column respectively. The letters within the coordinating areas 18 indicate the cooperating cells. The cell map 18 can be stored in the form of a table in memory of the serving base station 50. Typically, the cell IDs for the neighboring cells selected to serve as cooperating cells are stored in the cell map. In some embodiments, the cell map may store additional information about the neighboring cells, such as visibility metrics for the neighboring cells and the heights of the neighboring cells.

As will be described in further detail below, the neighboring cells serving as cooperating cells for each MC area 18 are selected based on a visibility metric that indicates the historically demonstrated signal quality of received signals transmitted from mobile terminals 20 within the MC area 18. In some embodiments of the invention, the cell map may also specify one or more candidate cooperating cells for each MC area 18. For example, the cell map may specify two neighboring cells serving as cooperating cells and two neighboring cells as candidate cooperating cells for each MC area 18. A visibility metric may be maintained and updated for each cooperating cell and candidate cooperating cell. If the visibility metric for a cooperating cell deteriorates, or the visibility metric for a candidate cooperating cell improves, a current cooperating cell can be replaced by a candidate cooperating cell.

The cell map is stored in memory by a serving base station for the serving cell, which may comprise a macro cell 12 or micro cell 14. When CoMP transmission or reception is desired for a given mobile terminal 20, the serving base station can use the cell map to determine the coordinating set for the mobile terminal 20. More particularly, the serving base station may determine the current location of the mobile terminal 20 and select the cooperating cells for the MC area 18 where the mobile terminal 20 is currently located.

Figure 3:
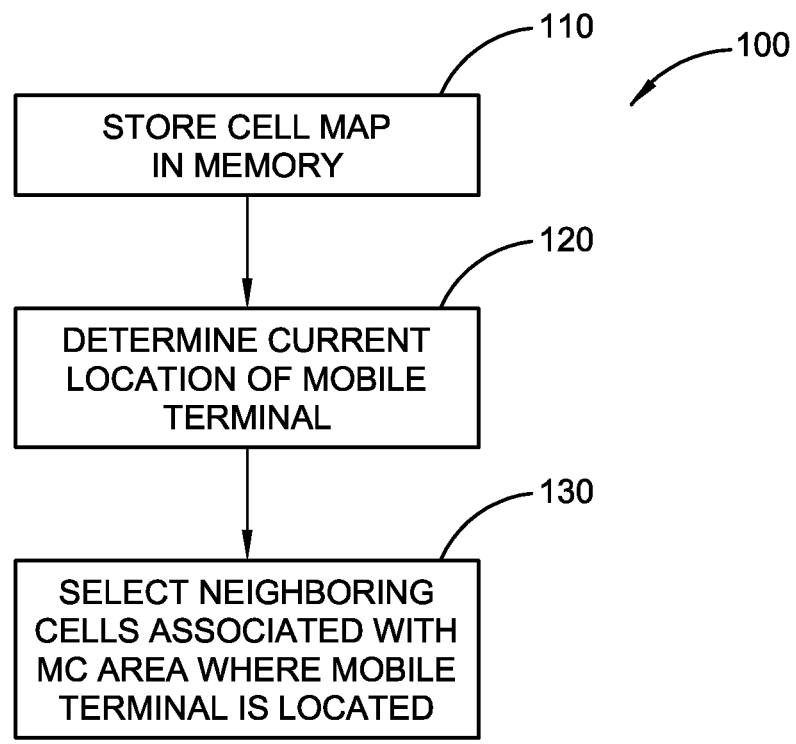
FIG. 3 illustrates an exemplary procedure for determining cooperating cells for a mobile terminal within a serving cell.

FIG. 3 illustrates an exemplary method implemented by a serving base station 50 (FIG. 5) for determining a coordinating set for a mobile terminal 20. The serving base station 50 stores a cell map in memory (block 110). The cell map associates one or more MC areas 18 within the serving cell with corresponding sets of neighboring cells 12, 14, referred to herein as neighbor cell sets. As previously described, the neighbor cell sets are determined from visibility metrics. That is, for a given coordinating area, the neighbor cell set comprises one or more neighboring cells 12, 14 that meet a predetermined visibility criterion based on the visibility metric. As one example, the neighbor cell set may include a predetermined number N of neighboring cells 12, 14 within the best visibility metric. One example of a visibility metric is the reference signal received power (RSRP). One interpretation of best is the visibility metric that has the highest (or lowest) metric depending on how the metric is computed. In other embodiments, the neighbor cell set includes every neighboring cell 12, 14 that meets a predefined visibility threshold. In this case, the visibility metric for each neighboring cell 12, 14 is compared to the threshold and, if the visibility metric meets the threshold, the neighboring cell 12, 14 is included in the neighbor cell set. Other techniques for defining the neighbor cell set could also be used. The serving base station 50 may be configured with a static cell map, or may dynamically update the cell map based on signal quality reports from either neighboring cells 12, 14 or mobile terminals 20 as hereinafter described.

When CoMP transmission or reception is required for a given mobile terminal 20, the serving base station 50 determines a current location of the mobile terminal 20 (block 120). If the mobile terminal 20 is equipped with a GPS receiver, the mobile terminal 20 can report its current location to the serving base station 50. Alternatively, the network can determine the current location of the mobile terminal 20 by triangulation methods and report the current location to the serving base station 50. In some circumstances, the GPS location of the mobile terminal 20 may not be known. In this case, the location of the mobile terminal 20 is assumed to be the cell location of the mobile terminal 20.

Once the location of the mobile terminal 20 is determined, the serving base station 50 selects one or more neighboring cells 12, 14 associated by the cell map with the current location of the mobile terminal 20 to include in the coordinating set, along with the serving cell (block 130). In cases where the GPS location of the mobile terminal 20 is known, the GPS location is correlated with the defined MC areas 18 to identify the MC area 18 where the mobile terminal 20 is currently located. One or more of the neighboring cells 12, 14 associated with the selected MC area 18 are then selected as coordinator cells. For cases where the GPS location of the mobile terminal 20 cannot be determined, the cell map may specify a neighbor cell set for the serving cell. Thus, the serving cell serves as a super MC area 18 for instances when only the cell location of the mobile terminal 20 is known. In this case, the serving base station 50 selects one or more neighboring cells 12, 14 in the neighbor cell set for the serving cell.

When selecting neighboring cells 12, 14 from a neighbor cell set for inclusion in a coordinating set, a number of approaches can be used. In some embodiments, the serving base station 50 may simply select a predetermined number of neighboring cells 12, 14 from the neighbor cell set. If visibility metrics for the neighboring cells are provided by the cell map, the serving base station 50 may select the neighboring cells 12, 14 with the best visibility metric. In other embodiments, the cell map may identify the neighboring cells only without providing the visibility metric. In this case, the serving base station 50 may select all of the neighboring cells 12, 14 to include in the coordinating set, or any subset of the neighboring cells 12, 14. In some embodiments, the number of cooperating cells selected may be dependent on mobile terminal specific quality of service (QoS) requirements.

The cell maps used by the serving base station 50 are generated by correlating signal quality measurements associated with many mobile terminals 20 at known locations with corresponding MC areas 18. In some embodiments, a mobile terminal 20 at a known location may be requested to perform a cell search and to report signal quality measurements for received signals from neighboring cells 12, 14. The mobile terminals 20 can send the signal quality measurements to the serving base station 50 in a signal quality report that also includes the current location of the mobile terminals 20. If signal quality measurements are collected and reported by many mobile terminals 20 at known locations throughout the cell, a cell map can be constructed from the signal quality measurements. More particularly, the current locations of the reporting mobile terminals 20 can be correlated with the defined MC areas 18 in the cell map and the signal quality measurements from all mobile terminals 20 within a given MC area 18 can be averaged to compute a visibility metric for the MC area 18. For example, the mobile terminals 20 may report reference signal received power (RSRP) for a plurality of cells 12, 14. The RSRP for many mobile terminals 20 within an MC area 18 can be averaged to determine the average reference signal receive power (RSRP) for the entire MC area 18. The average (RSRP) can be used as one visibility metric.

If only the cell location of the mobile terminals 20 are known, the signal quality measurements can be averaged into one super MC area 18 that coincides with the coverage area of the serving cell.

Another approach is to use received signal quality measurements made by neighboring cells when CoMP reception is used. More particularly, the serving base station 50 may request the neighboring cells 12, 14 to report the received signal quality associated with an uplink transmission from a mobile terminal 20 at a known location. The measurements may be collected and stored over a predefined period of time and reported to the serving base station 50 in a signal quality report. The signal quality report may include the signal quality measurements and associated positions of the mobile terminals. Alternatively, the serving base station 50 can associate measurements reported by the neighboring cells 12, 14 with the known locations of the mobile terminals 20. The locations of the mobile terminals 20 can then be correlated with the MC areas 18 in the cell map and the corresponding measurements can be averaged to derive a visibility metric for each MC area 18.

Figure 4:
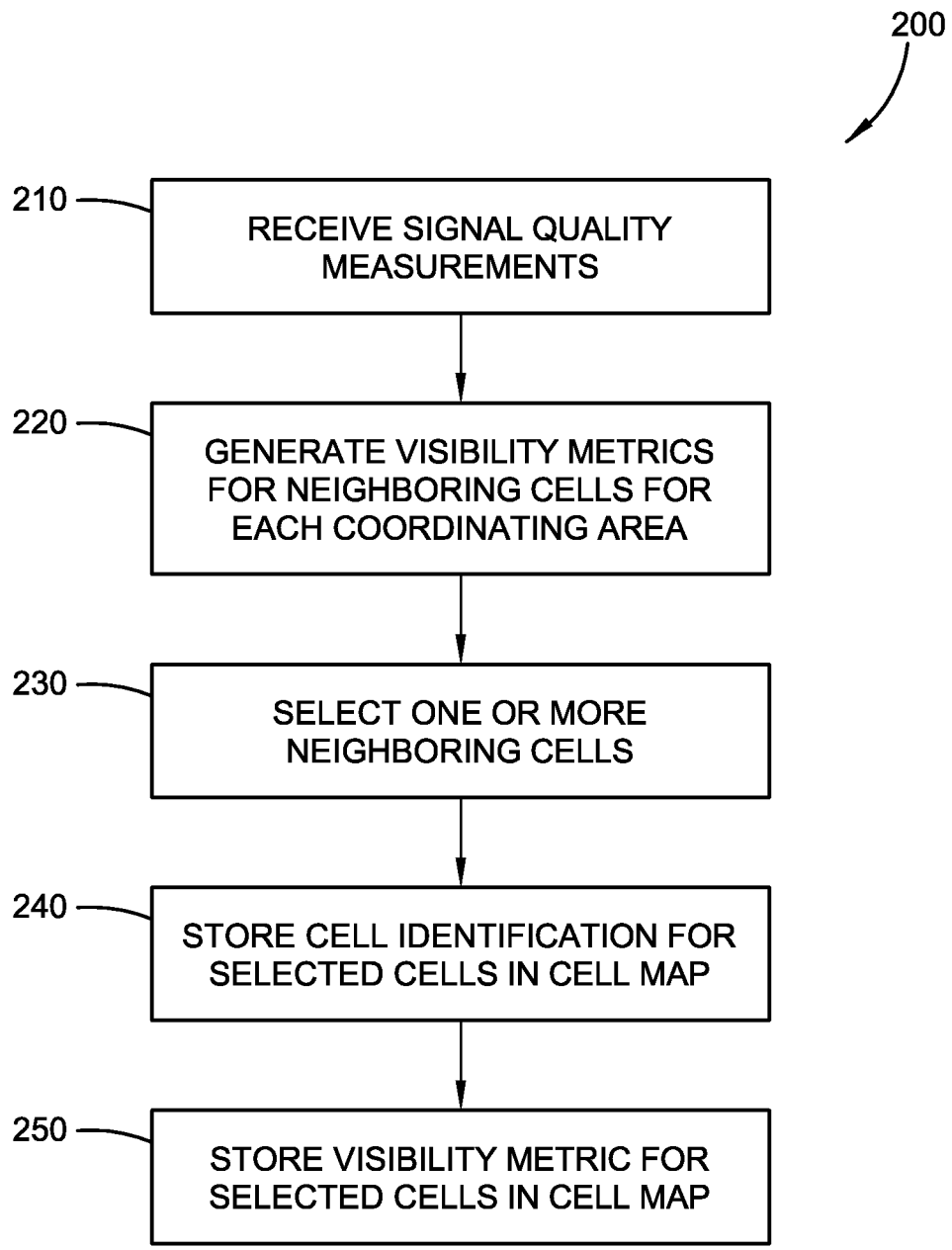
FIG. 4 illustrates an exemplary procedure for generating or updating a cell map.

FIG. 4 indicates an exemplary method 200 for generating or updating a cell map. The serving base station 50 receives signal quality measurements from neighboring cells or from mobile terminals within the serving cell (block 210). As previously noted, the signal quality measurements are associated with mobile terminals at known locations. The mobile terminal location may be included in a signal quality report sent to the serving base station 50. Alternatively, the serving base station 50 may track the location of the mobile terminals 20 and associate the received signal quality measurements with the mobile terminal locations. The signal quality measurements can then be correlated with different coordinating areas within the serving cell. Visibility metrics are then generated from the signal quality measurements (block 220). As one example, the serving base station 50 may compute an average of the signal quality measurements for each neighboring cell for each coordinating area 18. The computed averages can then be used as visibility metrics for the neighboring cells. The visibility metrics provide an indication of the visibility of each neighboring cell from each coordinating area 18.

After the visibility metrics are computed, the serving base station 50 selects one or more neighboring cells for each coordinating area 18 to include in the cell map (block 230). In one exemplary embodiment, the serving base station 50 may select a predetermined number of cells with the highest visibility metric. In other embodiments, the serving base station 50 may select all cells having a visibility metric that meets a predetermined visibility threshold. The serving base station 50 stores the cell identification for the selected cells in the cell map (block 240). In some embodiments, the serving base station 50 may also store the visibility metric for the selected cells in the cell map (block 250). Also, the serving base station 50 may store the height of the cooperating cells in the cell map or the height of the mobile terminal 20, which would lead to selecting different cooperating cells. For example, a mobile terminal 20 that is on a ground floor will result in a different coordinating set of cells compared with another mobile terminal 20 that is located on the $30^{th}$ floor. When taking into account the height of a mobile terminal 20, the cell map would be 3 dimensional. In that case, the grid of FIG. 2 will have a vertical axis in order to define a third dimension (e.g. the height).

In some embodiments, it may be possible to derive a mobile terminal specific cell map. When a mobile terminal 20 frequently visits a particular cell, and moves through the cell, it may be possible to collect a sufficient number of measurements to generate a cell map only from measurements associated with the single mobile terminal 20. As previously noted, the mobile terminal 20 may report reference signal received power for neighboring cells 12, 14 or alternatively, the neighboring cells 12, 14 may report received signal strength associated with uplink transmissions from the mobile terminal 20.

In some embodiments of the invention, the number of neighboring cells 12, 14 selected to serve as cooperating cells may be dependent on the state of the mobile terminals 20 or on load conditions within the network 10. For example, when the signaling load in the network 10 is light and there is sufficient bandwidth for inter cell signaling, the serving base station 50 may select a greater number of neighboring cells 12, 14 to serve as cooperating cells. Conversely, as the signaling load on the network 10 increases, the serving base station 50 may select fewer neighboring cells 12, 14 to serve as cooperating cells. This technique allows the serving base station 50 to increase performance at the expense of bandwidth consumption or visa versa.

FIG. 5 illustrates an exemplary serving base station 50 according to one exemplary embodiment. Serving base station 50 comprises a transceiver circuit 52 and a processing circuit 54. The processing circuit 54 includes a memory 56 for storing a cell map as herein described and a control unit 58 for controlling CoMP transmission and reception as herein described. Processing circuit 54 may comprise one or more processors, hardware, firmware, or a combination thereof. The processing circuit 54 may further include both volatile and nonvolatile memory 56 for storing program instructions and data for performing the methods herein described. The program instructions may be executed by the processing circuit 54 and may be stored in nonvolatile memory, e.g. read-only memory (ROM). Temporary data may be stored in volatile memory, e.g., random access memory (RAM). The control unit 58 is configured in some embodiments to implement the cell selection procedure shown in FIG. 3. In some embodiments, the control unit 58 may use a static cell map that is stored in memory 56. In other embodiments, the control unit 58 can be configured to update the cell map based on measurement reports from either the mobile terminals 20 or neighboring cells 12, 14.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a mobile communication network, a method of determining a coordinating set of cooperating cells for coordinated multipoint transmission and/or reception, said method comprising:
   generating a cell map for a coverage area of a serving cell serving a mobile terminal, the cell map dividing the coverage area into a plurality of coordinating areas and associating each coordinating area with a set of neighboring cells to serve as cooperating cells;
   storing, in a memory of a serving base station located in the service cell, the cell map;
   determining a current location of a mobile terminal within the serving cell; and
   selecting one or more of the neighboring cells in the set of neighboring cells associated with the coordinating area in which the mobile terminal is currently located to include in the coordinating set for the mobile terminal;
   wherein generating the cell map or updating the cell map comprises generating or updating the cell map based on signal quality reports from one or more neighboring cells or mobile terminals of each one of the plurality of coordinating areas, said signal quality reports comprising signal quality measurements associated with mobile terminals at known locations and wherein generating or updating the cell map comprises correlating the known locations associated with the signal quality measurements with corresponding coordinating areas, and averaging signal quality measurements associated with the same coordinating areas to obtain visibility metrics for the coordinating areas.

2. The method of claim 1 wherein the cell map further includes the visibility metrics for the neighboring cells for each coordinating area, wherein the visibility metrics provide at least an indication of a quality of signals of the neighboring cells from each coordinating area.

3. The method of claim 2 wherein selecting one or more of the neighboring cells in the set of neighboring cells comprises selecting one or more of the neighboring cells in the set with the highest visibility metric values.

4. The method of claim 2 further comprising updating said visibility metrics based on the signal quality reports received from one or more neighboring cells or mobile terminals.

5. The method of claim 1 wherein selecting one or more neighboring cells in the set of neighboring cells comprises selecting a predetermined number of neighboring cells in the set depending on a current signaling load in said mobile communication network.

6. The method of claim 3 wherein generating or updating the cell map further comprises storing the visibility metrics of the selected cells in the cell map.

7. The method of claim 1 wherein selecting one or more neighboring cells in the set of neighboring cells comprises, for each coordinating area, selecting one or more neighboring cells in the set based on the visibility metrics, and storing a cell identification of the selected cells in the cell map.

8. The method of claim 7 wherein selecting one or more of the neighboring cells in the set of neighboring cells for each coordinating area based on the visibility metrics comprises selecting a predetermined number of neighboring cells in the set with the best visibility metrics.

9. The method of claim 7 wherein selecting one or more of neighboring cells in the set of neighboring cells for each coordinating area based on the visibility metrics comprises selecting neighboring cells in the set with visibility metrics that meet a predetermined visibility threshold.

10. The method of claim 1 wherein selecting one or more of neighboring cells in the set of neighboring cells comprises selecting a number of neighboring cells in the set depending on a quality of service requirement for the mobile terminal.

11. A serving base station for a serving cell of a mobile communication network, said serving base station comprising:
    a transceiver circuit for transmitting downlink signals to mobile terminals served by the serving base station and receiving uplink signals from the mobile terminals; and
    a processing circuit including a memory, said processing circuit configured to:
      generate a cell map for a coverage area of the serving cell, the cell map dividing the coverage area into a plurality of coordinating areas and associating each coordinating area with a set of neighboring cells to serve as cooperating cells;
    store the cell map in the memory;
    determine a current location of a mobile terminal within the serving cell; and
    select one or more of the neighboring cells associated with the coordinating area in which the mobile terminal is currently located to include in a coordinating set for the mobile terminal;
    wherein the processing circuit is further configured to:
      generate or update the cell map from signal quality reports from one or more neighboring cells or mobile terminals of each one of the plurality of coordinating areas, wherein said signal quality reports comprise signal quality measurements associated with mobile terminals at known locations; and
      correlate the known locations associated with the signal quality measurements with corresponding coordinating areas, and to average signal quality measurements associated with the same coordinating areas to obtain visibility metrics for the coordinating areas.

12. The serving base station of claim 11 wherein the cell map further includes the visibility metrics for the neighboring cells for each coordinating area, wherein the visibility metrics provide at least an indication of a quality of signals of the neighboring cells from each coordinating area.

13. The serving base station of claim 12 wherein the processing circuit is further configured to select the one or more neighboring cells to include in the coordinating set based on selecting neighboring cells with the highest visibility metric values.

14. The serving base station of claim 12 wherein the processing circuit is further configured to update said visibility metrics based on the signal quality reports received from one or more neighboring cells or mobile terminals.

15. The serving base station of claim 11 wherein the processing circuit selects the one or more neighboring cells to associate with the coordinating area in which the mobile terminal is currently located, by selecting a predetermined number of neighboring cells depending on a current signaling load in said mobile communication network.

16. The serving base station of claim 13 wherein the processing circuit is further configured to store the visibility metrics of the selected cells in the cell map.

17. The serving base station of claim 11 wherein the processing circuit selects the one or more of the neighboring cells to include in the coordinating set for each coordinating area by selecting the one or more of the neighboring cells based on the visibility metrics, and stores a cell identification of the selected cells in the cell map.

18. The serving base station of claim 17 wherein the processing circuit selects the one or more neighboring cells to include in the coordinating set by selecting a predetermined number of the neighboring cells with the best visibility metrics.

19. The serving base station of claim 17 wherein the processing circuit selects the one or more neighboring cells to include in the coordinating set by selecting neighboring cells with visibility metrics that meet a predetermined visibility threshold.

20. The serving base station of claim 11 wherein the processing circuit selects the one or more neighboring cells to include in the coordinating set by selecting a number of neighboring cells depending on a quality of service requirement for the mobile terminal.

* * * * *